Feb. 20, 1951 G. D. GILLETT 2,542,659
DRAG-BARREL MOTOR
Filed Oct. 28, 1944 2 Sheets-Sheet 1

Inventor
Glenn D. Gillett.
By W. Glenn Jones
Attorney

Feb. 20, 1951 G. D. GILLETT 2,542,659
DRAG-BARREL MOTOR
Filed Oct. 28, 1944 2 Sheets-Sheet 2

Inventor
Glenn D. Gillett
By W Glenn Jones
Attorney

Patented Feb. 20, 1951

2,542,659

UNITED STATES PATENT OFFICE 2,542,659

DRAG-BARREL MOTOR

Glenn D. Gillett, New London, Conn., assignor to the United States of America as represented by the Secretary of the Navy Application October 28, 1944, Serial No. 560,847

5 Claims. (Cl. 172—120)

The present invention relates to an improved type of low-inertia motors. More particularly it relates to an induction motor having high torque at low speeds and also having low rotor inertia to permit it to serve as a driving means in a mechanism which must obey quickly and accurately the orders of a control means.

Existing low-inertia motors are of two types. The first type includes those of a squirrel-cage design in which the rotor has a very small diameter in relation to its length and is usually equipped with aluminum rotor bars to reduce the rotor inertia still further. The second type is of very different construction. In this type the magnetic core, normally a part of the stator, is fixed to the frame and the rotor consists of a thin cylindrical cup secured to the rotor shaft and rotating in the narrow annular air gap between the stator pole faces and the core. The rotor inertia is thus that of the cup and shaft and does not include the core. This type of motor is frequently called a "drag-cup" motor.

The present invention was developed to provide a higher torque-to-inertia ratio and greater efficiency than are obtainable in the drag-cup motor. This end is obtained by providing a more rigid rotor which permits an increase in its length and a reduction in the width of the air gap between the stator and the core.

Referring to the accompanying illustrations:

Figure 1:
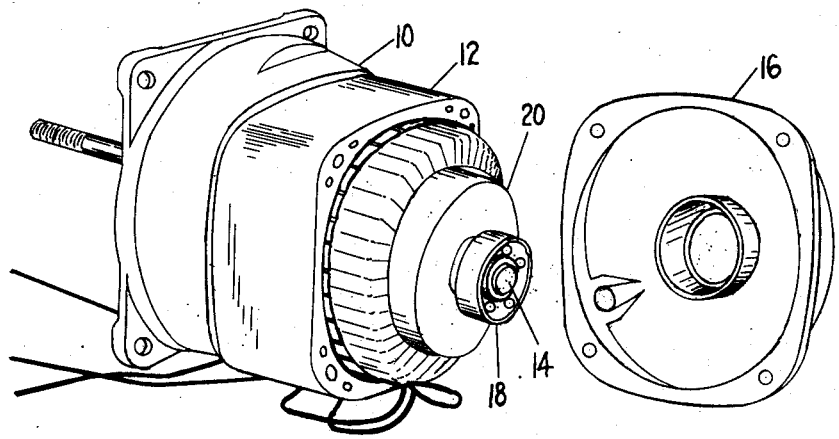
Fig. 1 is a perspective view of the motor, partially disassembled.

Referring now to Fig. 1:

The motor consists of a frame 10 in which is secured a stator assembly 12. A rotor shaft 14 is carried by end pieces 16 in bearings 18. A rotor shell 20 having an outside diameter only slightly less than the inside diameter of the stator 12 is secured to the shaft 14.

Figure 2:
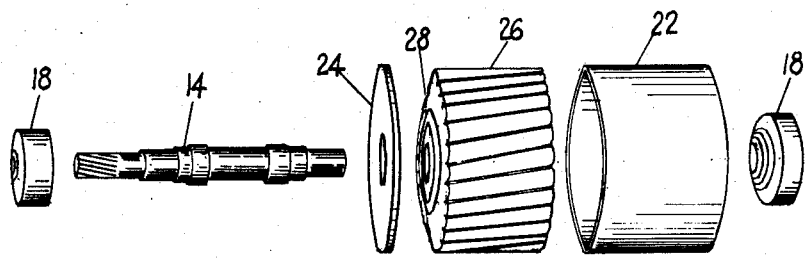
Fig. 2 is an exploded perspective view of the rotor showing the core, which is not visible in Fig. 1.

Referring now to Fig. 2:

The shell 20 is composed of a tubular portion 22 supported between end disks 24 secured to the shaft 14. A laminated iron (magnetic) core 26 is carried on the shaft 14 inside the shell on bearings 28 and thus is capable of rotation with respect to the said shaft and shell. The core has the maximum diameter possible consistent with free rotation.

Operation of the motor is as follows:

The stator 12 is wound for multi-phase operation. When these windings are energized the flux passes across the gap between the stator 12 and the core 26 through the rotor shell 20. Eddy currents are set up in the shell and cause it to rotate in a manner similar to a convention squirrel-cage rotor. The core 26, being carried on the shaft 14 by the bearings 28, does not rotate with the shell and shaft and they, by reason of their low inertia, can be rapidly accelerated or decelerated. The core 26, by reason of the slight eddy currents induced in it, accelerates and decelerates much more slowly than the rotor and does not affect the motor's operation.

Figure 3:
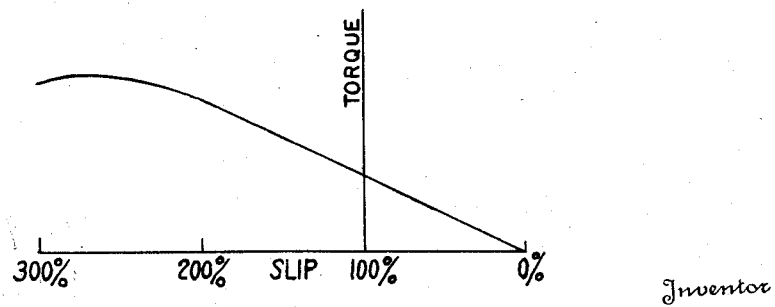
Figs. 3 and 4 are typical performance curves of the motor.

A high rate of acceleration at the lower speeds is obtained by making the tubular portion 22 of the rotor as thin as possible, thereby increasing its resistance. This results in a slip-torque curve of the type shown in Fig. 3 in which the peak of the curve occurs at some slip greater than 100%.

Figure 4:
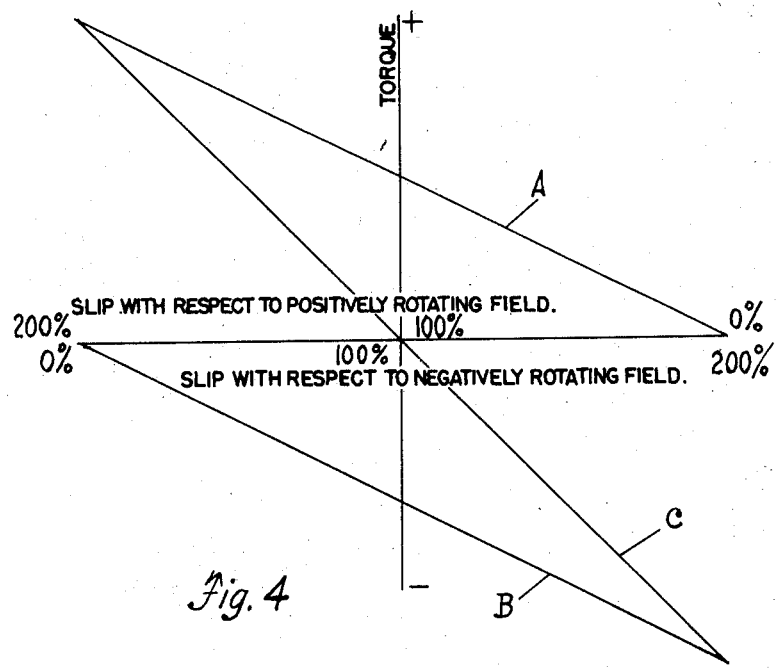

The type of rotor construction mentioned in the preceding paragraph makes it possible to apply a high braking torque by de-energizing one phase of the stator winding. When this occurs the motor becomes a single-phase machine. The pulsating field of a single-phase motor may be considered to be the resultant of two fields of equal magnitude rotating in opposite directions. When one of the energizing phases of a motor having a high resistance armature is opened, the single-phase slip-torque curve is as shown in Fig. 4. Here curve A shows the torque of the component field rotating in the same direction as the rotor, B the torque of the other component field, and C their resultant. From this, it can be seen that a braking torque is applied as soon as the second phase circuit is opened and that it persists until the rotor is at a standstill, reaching zero at zero speed.

Figure 5:
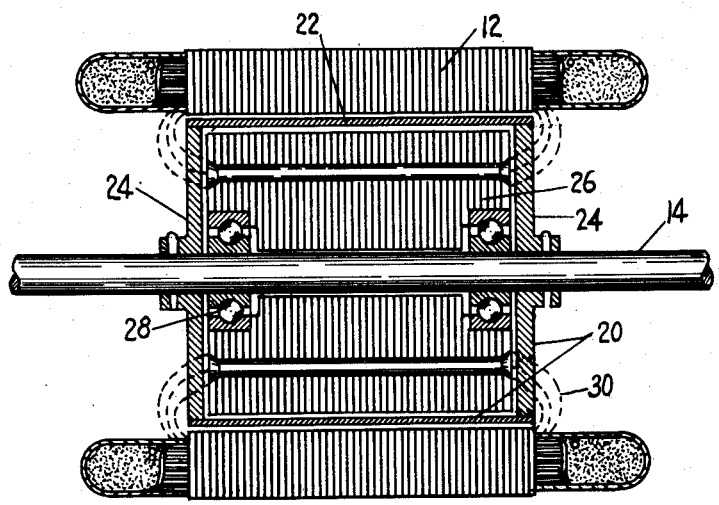
Fig. 5 is an axial section through the motor.

Referring now to Fig. 5:

The greater part of the flux (represented by broken lines 30) passes across the air gap through the tubular portion 22 of the shell. A small part of the flux from the ends of the stator pole pieces passes through the end disks 24. In the drag-cup motor more than half of this end flux passes around the open end of the cup, the magnetic field of the stator being distorted by the effect of the eddy currents in the rotor, as it would in the present motor if one of the disks 24 were removed, and does no useful work. Thus the present motor, by causing all of the flux to pass through the rotor shell, is more efficient than the drag-cup motor.

A further advantage of the present motor is that the tubular portion 22, being carried on two end disks 24, is more rigid and can be made relatively longer than the corresponding part of the drag-cup motor. By increasing the length it can be made smaller in diameter for a given torque, thereby increasing the torque-to-inertia ratio. The increased rigidity permits a decrease in clearances between the rotor and the stator and core thus decreasing the reluctance of the magnetic path and increasing the flux acting on the rotor.

All of the aforementioned effects increase the torque applied to the rotor and, for a given inertia, produce a greater acceleration.

Drag-cup motors with a single bearing mounting are known in the art. The present device however comprises a drag-barrel motor with the rotor supported at each end. This not only provides a more stable mounting but reduces the required clearance between the stator and the core, increasing the flux per ampere turn in the motor by decreasing the air gap required at the rotor.

Obviously minor modifications may be made in the form and dimensions of the parts without departing from the spirit and scope of the present invention, as defined in the appended claims.

What is claimed is:

1. In a quick acting alternating current motor, means including a multi-phase wound stator for producing a rotating field within a cylindrical area therein, a power shaft mounted for rotation concentrically within said cylindrical area, a cylindrical rotor member of laminated soft magnetic material rotatively supported on said shaft and arranged for synchronous rotation with said field upon continued excitation thereof and having anti-friction bearing members supporting said rotor member for free rotation with respect to the shaft, a cylindrical drag-barrel motor member of low specific resistance fixedly mounted on the shaft in driving relation thereto and substantially filling the cylindrical space between said stator and rotor member, and a pair of conductive end members supporting and closing the respective ends of said drag-barrel member, whereby all flux between said stator and rotor member effectively engages the drag-barrel motor to produce driving force therein, said core member being slowly accelerable and said drag-barrel rapidly accelerable under reactive forces of the eddy currents induced therein, respectively, by application of said rotating field, and said reactive forces being terminable substantially at the instant of de-energization of said field.

2. In a quick starting motor of the drag-barrel type, a stator member energizable to produce a rotating field therein, a conductive drag-barrel rotor mounted concentrically within the stator and rotatively fixed to a supporting shaft, a cylindrical core member substantially filling said rotor member and rotatably mounted on said shaft, said core member being of transversely laminated soft magnetic material whereby the core member is prevented from absorbing substantial portions of rapid changes in the energy of said field and is synchronously rotative with said field on continued field energization, and a pair of conductive end members secured to said rotor and electrically enclosing the core member whereby said rapid changes in flux effectively engage the drag-barrel without flux loss to produce starting torque therein.

3. The motor of claim 2 wherein the barrel has a length greater than the diameter thereof for providing a high torque to inertia ratio for said barrel.

4. In a quick-starting motor, a cylindrical stator member having a polyphase winding for producing a rotating field therein, a conductive cylindrical rotor shell arranged concentrically within the stator and in driving relation to a supporting shaft, a cylindrical core substantially filling said rotor shell and rotatably mounted on said shaft, said core being of divided ferromagnetic structure whereby the core is prevented from absorbing substantial portions of rapid changes in the energy of said field and is synchronously rotatable with said field on continued rotation thereof, and a pair of conductive end members secured to said shell substantially completing electrical enclosure of the core whereby rapid changes of flux engage said shell and end members substantially without loss in producing starting torque therein.

5. In a drag-barrel type motor having a stator of generally cylindrical form wound for polyphase excitation, a soft ferromagnetic core of the same form as said stator to uniformly receive flux from said stator for all rotative positions, said core being of divided structure to reduce starting torque therein, a shaft supporting said core for free rotation thereon concentrically within the stator, and a thin non-magnetic shell of conductive material enclosing the core and rotatively fixed to said shaft for quick-starting driving thereof in accordance with the instant excitation of said polyphase winding, said shell substantially filling the space between the core and stator and extending to said shaft for preventing torqueless flux linkage between the stator and core.

GLENN D. GILLETT.

REFERENCES CITED

The following references are of record in the file of this patent:

UNITED STATES PATENTS

| Number | Name | Date |
|---|---|---|
| 518,310 | Duncan | Apr. 17, 1894 |
| 541,641 | Still | June 25, 1895 |
| 1,913,211 | Prince | June 6, 1933 |
| 2,159,768 | Macmillan | May 23, 1939 |

FOREIGN PATENTS

| Number | Country | Date |
|---|---|---|
| 4,170 | Switzerland | Sept. 2, 1891 |